(12) United States Patent
Takahashi

(10) Patent No.: US 9,647,500 B2
(45) Date of Patent: May 9, 2017

(54) ROTOR FOR ROTATING ELECTRIC MACHINE

(71) Applicant: DENSO CORPORATION, Kariya, Aichi-pref. (JP)

(72) Inventor: Yuki Takahashi, Obu (JP)

(73) Assignee: DENSO CORPORATION, Kariya (JP)

( * ) Notice: Subject to any disclaimer, the term of this patent is extended or adjusted under 35 U.S.C. 154(b) by 735 days.

(21) Appl. No.: 14/070,634

(22) Filed: Nov. 4, 2013

(65) Prior Publication Data

US 2014/0125184 A1    May 8, 2014

(30) Foreign Application Priority Data

Nov. 2, 2012 (JP) .................................. 2012-242815

(51) Int. Cl.
*H02K 1/27* (2006.01)

(52) U.S. Cl.
CPC .............. *H02K 1/276* (2013.01); *H02K 1/27* (2013.01); *H02K 1/2766* (2013.01); *H02K 2213/03* (2013.01)

(58) Field of Classification Search
CPC ........ H02K 1/27; H02K 1/276; H02K 1/2766; H02K 2213/03
USPC .......................... 310/156.53, 156.56, 156.57
See application file for complete search history.

(56) References Cited

U.S. PATENT DOCUMENTS

| 7,504,754 | B2 * | 3/2009 | Jahns ................... | H02K 1/2766 |
| | | | | 310/156.53 |
| 7,560,842 | B2 * | 7/2009 | Hattori ................. | H02K 1/2766 |
| | | | | 310/156.53 |
| 7,851,958 | B2 * | 12/2010 | Cai ...................... | H02K 1/2766 |
| | | | | 310/156.53 |

(Continued)

FOREIGN PATENT DOCUMENTS

| JP | 2008-104323 | 5/2008 |
| JP | 2011-101504 | 5/2011 |
| JP | 2012-39775 | 2/2012 |

OTHER PUBLICATIONS

Office Action (2 pgs.) dated Jul. 2, 2015 issued in corresponding Japanese Application No. 2012-242815 (2 pgs.).

(Continued)

*Primary Examiner* — John K Kim
(74) *Attorney, Agent, or Firm* — Nixon & Vanderhye P.C.

(57) ABSTRACT

A rotor includes a rotor core in which a plurality of magnet housing holes are arrayed in a circumferential direction and a plurality of magnets fixed and held in the magnet housing holes by a filler material. The rotor core includes: a q-axis core portion, an outer flux bather that is formed between the q-axis core portion and the magnet and is filled with the filler material; and a bridge portion formed between a stator-side core portion and the q-axis core portion. The bridge portion includes a large-width portion, a small-width portion and a medium-width portion that are sequentially disposed from the q-axis core portion side towards the stator-side core portion side in the circumferential direction. The large-width (Continued)

portion has the largest radial-direction width. The small-width portion has the smallest radial-direction width. The medium-width portion has a medium radial-direction width between the largest radial-direction width and the smallest radial-direction width.

6 Claims, 11 Drawing Sheets

(56) References Cited

U.S. PATENT DOCUMENTS

| | | | | |
|---|---|---|---|---|
| 8,138,651 | B2* | 3/2012 | Rahman | H02K 1/2766 310/156.53 |
| 8,729,763 | B2* | 5/2014 | Kogure | H02K 1/2766 310/153.53 |
| 9,312,731 | B2* | 4/2016 | Takahashi | H02K 1/2706 |
| 2008/0093944 | A1 | 4/2008 | Takahashi et al. | |
| 2011/0254474 | A1* | 10/2011 | Saito | H02K 1/24 318/139 |
| 2012/0032539 | A1 | 2/2012 | Hori et al. | |
| 2012/0274165 | A1* | 11/2012 | Fukaya | H02K 1/27 310/156.01 |
| 2012/0274169 | A1 | 11/2012 | Saito et al. | |
| 2013/0113328 | A1* | 5/2013 | Kogure | H02K 1/2766 310/156.53 |
| 2014/0125184 | A1* | 5/2014 | Takahashi | H02K 1/276 310/156.53 |

OTHER PUBLICATIONS

Office Action (2 pgs.) dated Oct. 28, 2014 issued in corresponding Japanese Application No. 2012-242815 with an at least partial English-language translation thereof (4 pgs.).

* cited by examiner

RATIO (W3/W2) OF MEDIUM-WIDTH PORTION (W3)
TO SMALL-WIDTH PORTION (W2) (WHEN W2=1)

AREA AR1 ENCLOSED BY
THREE LINES L1 TO L3

|  | RATIO (W1:W2:W3) | | |
| --- | --- | --- | --- |
|  | LARGE-WIDTH PORTION W1 | SMALL-WIDTH PORTION W2 | MEDIUM-WIDTH PORTION W3 |
| POINT A | 1.65 | 1.00 | 1.05 |
| POINT B | 1.70 | 1.00 | 1.05 |
| POINT C | 1.75 | 1.00 | 1.10 |
| POINT D | 1.65 | 1.00 | 1.18 |

ROTOR FOR ROTATING ELECTRIC MACHINE

CROSS-REFERENCE TO RELATED APPLICATION

This application is based on and claims the benefit of priority from Japanese patent application No. 2012-242815, filed on Nov. 2, 2012, the disclosure of which is incorporated herein in its entirety by reference.

BACKGROUND

Technical Field

The present invention relates to a rotor for a rotating electric machine that is mounted in a vehicle, such as a hybrid car or an electric car, and used as an electric motor or a power generator.

Related Art

Conventionally, a rotating-field type synchronous motor (referred to, hereinafter, as an interior permanent magnet [IPM] motor) is known as a rotating electric machine that is mounted and used in a vehicle. The IPM motor has a structure in which a magnet is embedded within a rotor. The IPM motor is capable of using both reluctance torque generated by magnetization of the rotor and torque generated by magnetization of the magnet. Because of its high efficiency, the IPM motor is favorably used in hybrid cars, electric cars, and the like.

The IPM motor includes a stator and a rotor. The stator and the rotor are disposed such as to oppose each other in a radial direction. A rotor that includes a rotor core and a plurality of magnets is known. In the rotor, the rotor core is disposed such as to oppose the stator in the radial direction. The rotor core has a plurality of magnet housing holes that are arrayed in a circumferential direction. Each of the plurality of magnets is housed in a magnet housing hole. The plurality of magnets form a plurality of magnetic poles that are arrayed in the circumferential direction.

JP-A-2011-101504 discloses a rotor core that has a flux barrier (magnetic gap) and a bridge portion. The flux bather is formed between a q-axis core portion and a magnet. The q-axis core portion is formed between magnetic poles that are adjacent to each other in the circumferential direction of the rotor. The bridge portion is formed between a stator-side core portion and the q-axis core portion. The stator-side core portion is positioned on the stator side of the magnet.

In this instance, the width of the bridge portion in the radial direction increases from the magnet side towards the q-axis core portion side in the end portion on the q-axis core portion side. As a result, concentration of stress occurring in the bridge portion based on centrifugal force during rotation of the rotor can be dispersed.

In the above-described conventional rotor, the magnets embedded in the rotor core are fixed and held by a filler material. The filler material is composed of a non-magnetic material, such as resin, and fills the area between the magnet and the wall surface of the magnet housing hole. The flux bather is continuously and integrally formed with the magnet housing hole on the q-axis core portion side of the magnet housing hole.

The flux barrier may also be filled with the filler material that fixes and holds the magnet. When the flux barrier is also filled with the filler material, the filler material repeatedly expands and contracts in accompaniment with the change in environmental temperature during operation and stop of the rotating electric machine. At this time, concentration of stress easily occurs in the bridge portion of the rotor core. JP-A-2011-101504 does not include any disclosure regarding the concentration of stress occurring in the bridge portion in accompaniment with the temperature change in the filler material that fills the flux barrier.

SUMMARY

An exemplary object of the present disclosure is to provide a rotor for a rotating electric machine that suppresses concentration of stress by dispersing, with more certainty, stress generated by temperature change in a filler material that fills a flux barrier and stress generated by centrifugal force during rotation of the rotor, and is capable of ensuring sufficient strength in a bridge portion.

The present disclosure is a rotor for a rotating electric machine including: a rotor core that is disposed such as to oppose a stator in a radial direction of the rotor and has a plurality of magnet housing holes arrayed in a circumferential direction of the rotor; and a plurality of magnets, each housed in the magnet housing hole, that form a plurality of magnetic poles arrayed in the circumferential direction and are fixed and held in the magnet housing holes by a filler material.

The rotor core includes: a q-axis core portion formed between two magnetic poles that are adjacent to each other in the circumferential direction; an outer flux barrier that is formed between the q-axis core portion and the magnet and is filled with the filler material; and a bridge portion that is formed between a stator-side core portion positioned on the stator side of the magnet housing hole and the q-axis core portion.

The bridge portion includes a large-width portion, a small-width portion and a medium-width portion that are sequentially disposed from the side of the q-axis core portion towards the side of the stator-side core portion in the circumferential direction. The large-width portion has the largest radial-direction width in the bridge portion. The small-width portion has the smallest radial-direction width in the bridge portion. The medium-width portion has a medium radial-direction width between the radial-direction width of the large-width portion and the radial-direction width of the small-width portion.

In a rotating electric machine including the rotor of the present invention, the filler material filling the outer flux barrier of the rotor core repeatedly expands and contracts in accompaniment with changes in environmental temperature during operation and stop. At this time, stress is generated in the bridge portion of the rotor core. In addition, stress is generated in the bridge portion of the rotor core as a result of centrifugal force during rotation of the rotor. At this time, the bridge portion is configured such that the large-width portion, the small-width portion, and the medium-width portion are sequentially disposed from the q-axis core portion side towards the stator-side core portion side. The large-width portion, the small-width portion, and the medium-width portion refer to the width of the bridge portion in the radial direction.

Therefore, the stress concentrated in the large-width portion and the medium-width portion on both ends of the bridge portion in the circumferential direction (length direction) can be spread to the small-width portion in the center portion of the bridge portion in the circumferential direction. Therefore, the stress generated in the bridge portion in accompaniment with the temperature change in the filler material that fills the outer flux barrier and the stress generated in the bridge portion by centrifugal force during rotation of the rotor can be dispersed with more certainty. Concentration of stress can be suppressed. As a result, sufficient strength of the bridge portion can be ensured.

In the present disclosure, an insulating material that has a coefficient of linear expansion similar to that of metal can be favorably used as the filler material. Specifically, polyetherimide (PEI), a resin containing a large amount of glass fibers (such as 40% or more), a resin containing silica as a filler to achieve a coefficient of linear expansion similar to that of metal, and the like can be given.

DESCRIPTION OF EMBODIMENTS

Embodiments of a rotor for a rotating electric machine of the present invention will hereinafter be described in detail with reference to the drawings.

First Embodiment

A rotor for a rotating electric machine according to a first embodiment will be described with reference to FIGS. 1 and 2. A rotor 10A according to the first embodiment is mounted in a rotating electric machine (not shown) that is used, for example, as a motor for a vehicle. The rotor 10A is disposed within a housing in the rotating electric machine such as to rotate freely on an inner circumferential side of a stator (not shown). The rotating electric machine has a rotation shaft (not shown) that is held by the housing with a bearing therebetween, such that both end portions of the rotation shaft rotate freely. The rotor 10A according to the first embodiment is fitted onto and fixed to an outer circumferential surface of the rotation shaft. The rotor 10A is disposed such as to oppose the stator in a radial direction. A predetermined air gap is formed between the inner circumferential surface of the stator and the outer circumferential surface of the rotor 10A.

A plurality of slots (not shown) are provided on the inner circumferential surface of the stator such as to be arrayed at even intervals in the circumferential direction. The slots are formed such as to pass through the stator in an axial direction. According to the first embodiment, 72 slots are disposed at even intervals in the circumferential direction. The 72 slots correspond with the number of magnetic poles (12 poles) in the rotor 10A and house a three-phase stator coil (not shown).

Figure 1:
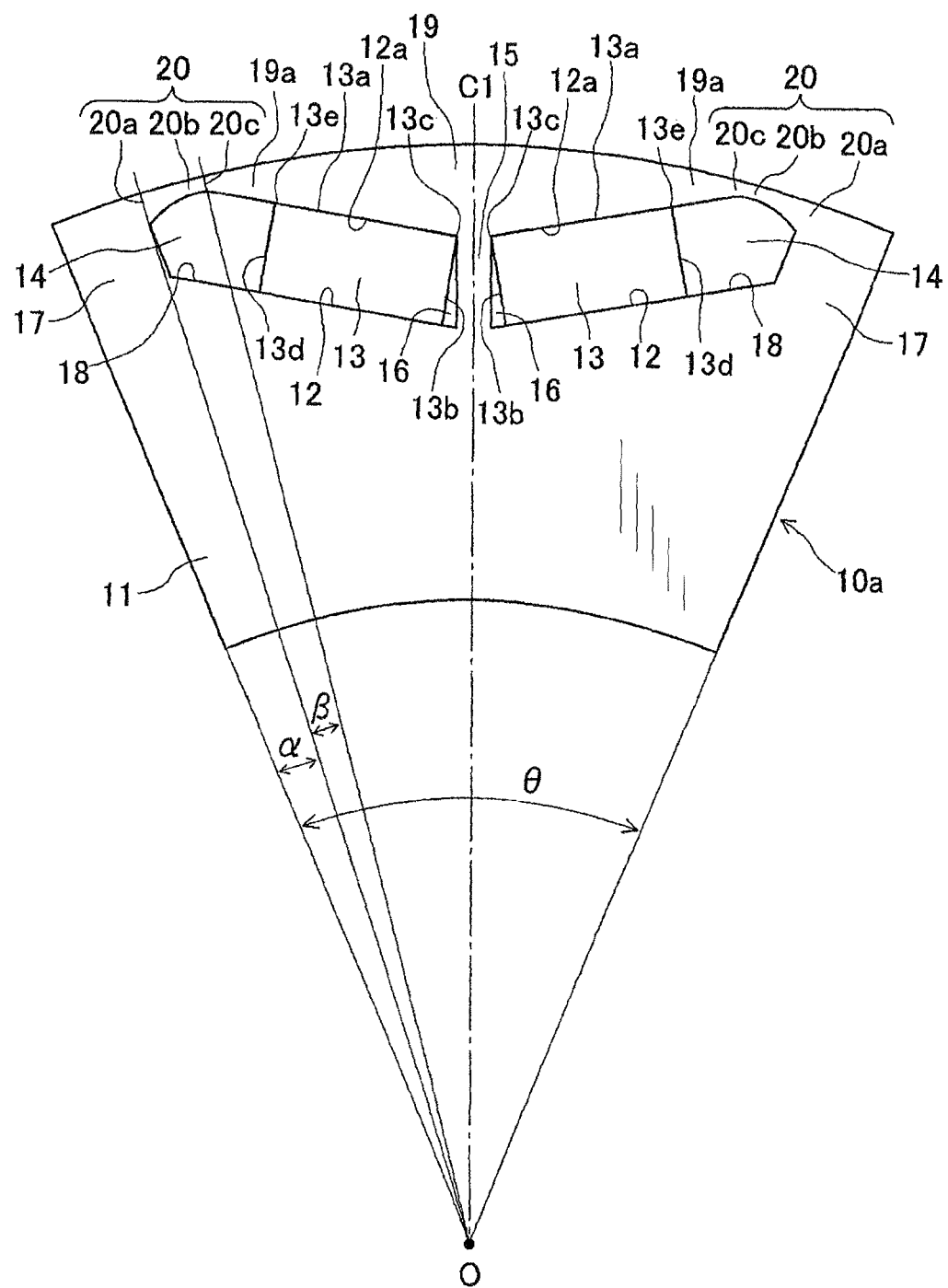
FIG. 1 is a partial planar view of an area amounting to a single magnetic pole in a rotor for a rotating electric machine according to a first embodiment.

As shown in FIG. 1, the rotor 10A according to the first embodiment has a rotor core 11, a plurality of magnets (permanent magnets) 13, and a filler material 14. The rotor core 11 is fitted onto and fixed to the outer circumference of the rotation shaft. The rotor core 11 has a plurality of magnet housing holes 12 that are arrayed in the circumferential direction. Each of the plurality of magnets 13 is housed in a magnet housing hole 12. The filler material 14 is composed of a resin (non-magnetic member) and fills the area between the wall surface of the magnet housing hole 12 and the magnet 13.

The rotor core 11 is formed into a thick, circular cylinder. The rotor core 11 is composed of a plurality of ring-shaped magnetic steel sheets stacked in the axial direction. Each magnetic steel sheet has a through-hole in the center. The rotor core 11 is fixed by the through-hole being fitted onto the outer circumference of the rotation shaft. The plurality of magnet housing holes 12 (24 holes according to the first embodiment) are provided on the outer circumferential surface side of the rotor core 11 that opposes the inner circumferential surface of the stator. The magnet housing holes 12 are formed such as to pass through the rotor core 11 in the axial direction. The magnet housing holes 12 are separated from each other by a predetermined distance in the circumferential direction.

Each magnet housing hole 12 is formed having an irregular, substantially rectangular cross-sectional shape in a direction at a right angle to a center axis O of the rotor core 11. The magnet housing holes 12 form pairs of two. A total of 12 pairs of magnet housing holes 12 are provided at even intervals in the circumferential direction. The two magnet housing holes 12 and 12 that form a pair are disposed in a V-shape, such that the distance between the two magnet housing holes 12 and 12 increases towards the outer circumferential side (stator side) of the rotor core 11.

A center bridge 15 is formed between the pair of magnet housing holes 12 and 12. The center bridge 15 extends in the radial direction at a substantially fixed width in the circumferential direction. The center bridge 15 is provided to cause flux saturation in the area between the pair of magnet housing holes 12 and 12 and inhibit the formation of a magnetic circuit.

The magnet (permanent magnet) 13 is housed in each magnet housing hole 12. The magnet 13 has a rectangular cross-sectional shape in the direction at a right angle to the center axis O of the rotor core 11. According to the first embodiment, a single magnetic pole is formed by the pair of magnets 13 and 13 housed in the pair of magnet housing holes 12 and 12 that are disposed in a V-shape. In this instance, the 12 pairs of magnets 13 and 13 form a plurality of magnetic poles (12 poles [6 N-poles and 6 S-poles] according to the first embodiment). The polarity of the magnetic poles alternates in the circumferential direction.

In an area of the rotor 10A amounting to a single magnetic pole, the pair of magnet housing holes 12 and 12 are formed such as to be linearly symmetrical in relation to a magnetic-pole center line C1. The magnetic-pole center line C1 passes through the center axis O of the rotor core 11 and the center of the magnetic pole. In addition, the pair of magnets 13 and 13 forming a single magnetic pole are disposed such as to be linearly symmetrical in relation to the magnetic-pole center line C1 (in a V-shape that widens towards the outer circumferential side).

The magnet 13 that is housed in each magnet housing hole 12 is positioned in a state in which a corner portion 13c is in contact with a corner portion in the end portion of the center bridge 15 on the outer circumferential side (base portion of the center bridge 15). The corner portion 13c of the magnet 13 is a corner at which a stator-side end surface 13a and a center-bridge-side end surface 13b meet.

In this instance, the center-bridge-side end surface 13b of the magnet 13 and a side wall surface of the center bridge 15 that oppose each other are formed such as to become farther apart towards the inner circumferential side of the rotor core 11. As a result, an inner flux barrier 16 is formed on the center bridge 15 side of the magnet 13 that is housed in the magnet housing hole 12. The inner flux barrier 16 has a triangular cross-sectional shape and serves as a magnetic gap portion.

A q-axis core portion 17 is formed between two magnetic poles that are adjacent to each other in the circumferential direction of the rotor core 11. The q-axis core portion 17 is an area in which magnetic flux flows from between the magnetic poles to an area between other magnetic poles. An outer flux barrier 18 is provided between the magnet 13 housed in the magnet housing hole 12 and the q-axis core portion 17. In other words, the outer flux barrier 18 is provided on the q-axis core portion 17 side of the magnet housing hole 12. The outer flux barrier 18 serves as a magnetic gap portion.

The magnet 13 that is housed in the magnet housing hole 12 is fixed and held within the magnet housing hole 12 by the filler material 14. The filler material 14 is composed of, for example, an epoxy resin (non-magnetic member) and fills the area between the magnet 13 and the side wall of the magnet housing hole 12. According to the first embodiment, the overall areas of the inner flux barrier 16 and the outer flux barrier 18 are also filled with the filler material 14. As a result, the magnet 13 that is housed in the magnet housing hole 12 is firmly fixed and held within the magnet housing hole 12.

The rotor core 11 has a stator-side core portion 19 on the stator side of the pair of magnet housing holes 12 and 12 that are disposed in a V-shape. The stator-side core portion 19 has a projecting portion 19a. The projecting portion 19a projects towards the side of the q-axis core portion 17 with a corner portion 13e as a starting point. The corner portion 13e is a corner at which the stator-side end surface 13a and a q-axis core portion-side end surface 13d of the magnet 13 housed in the magnet housing hole 12 meet.

According to the first embodiment, a wall surface of the projecting portion 19a on the inner circumferential side is formed into a flat surface that continues from a stator-side wall surface 12a of the magnet housing hole 12 and widens in a planar shape. The corner portion 13e of the magnet 13 housed in the magnet housing hole 12 comes into contact with the stator-side wall surface 12a of the magnet housing hole 12. As a result, the filler material 14 does not easily enter the area between the stator-side end surface 13a of the magnet 13 and the stator-side wall surface 12a of the magnet housing hole 12.

A bridge portion 20 is formed between the projecting portion 19a and the q-axis core portion 17. The bridge portion 20 is composed of a large-width portion 20a, a small-width portion 20b, and a medium-width portion 20c. The large-width portion 20a, the small width portion 12b, and the medium-width portion 20c are sequentially disposed from the side of the q-axis core portion 17 towards the stator-side core portion 19.

Figure 2:
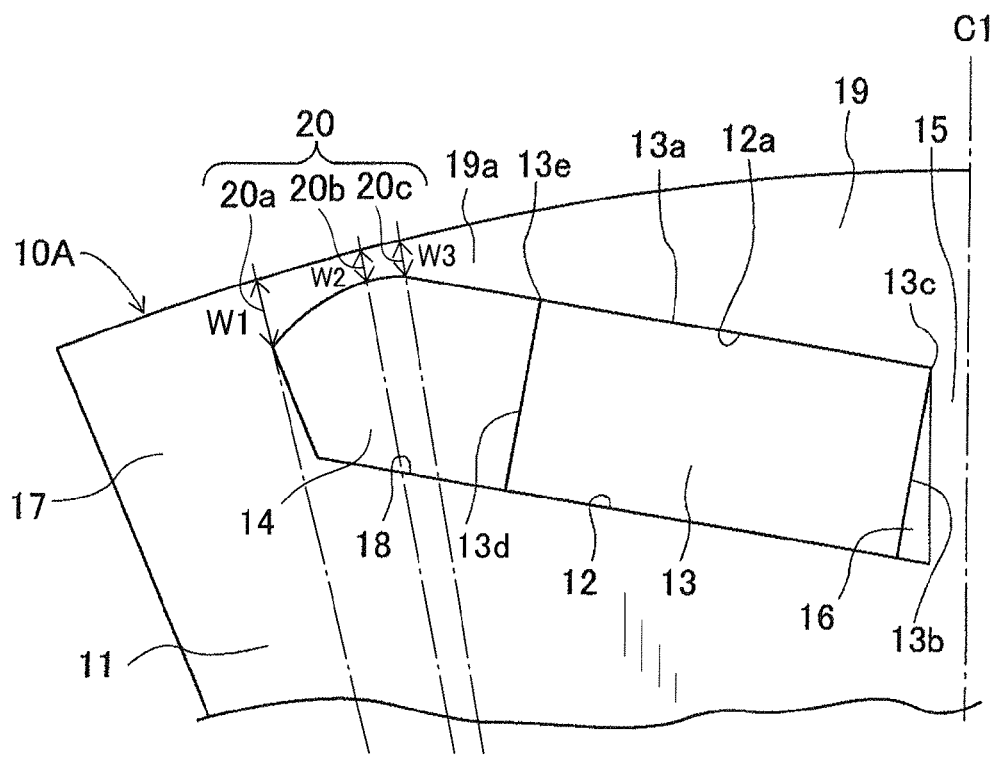
FIG. 2 is an enlarged partial planar view of a main section in FIG. 1.

As shown in FIG. 2, the large-width portion 20a has the largest width W1 in the radial direction. The small-width portion 20b has the smallest width W2 in the radial direction. The medium-width portion 20b has a width W3 in the radial direction that is between those of the large-width portion 20a and the small-width portion 20b (i.e., W2<W3<W1). A wall surface of the bridge portion 20 on the inner circumferential side is formed into at least a single arc-shaped surface (curved surface) that divides the large-width portion 20a, the small-width portion 20b, and the medium-width portion 20c. In addition, the width of the bridge portion 20 in the radial direction refers to a distance in the radial direction from the outer circumferential surface of the rotor core 11 to the outer flux barrier 18.

According to the first embodiment, a dimensional ratio of the radial-direction width W1 of the large-width portion 20a to the radial-direction width W2 of the small-width portion 20b to the radial-direction width W3 of the medium-width portion 20c of the bridge portion 20 is set to 1.7:1:1.1 (W1:W2:W3=1.7:1:1.1). A suitable range of the dimensional ratio was confirmed by a first test, described hereafter.

The boundary between the projecting portion 19a and the bridge portion 20 is an area at which the wall surface formed by the flat surface on the inner circumferential side of the projecting portion 19a and the wall surface formed by the curved surface on the inner circumferential side of the medium-width portion 20c of the bridge portion 20 meet.

Here, as shown in FIG. 1, the angle of the pole pitch per single magnetic pole of the magnets 13 (an angle obtained by dividing the total angle of circumference 360 degrees of the rotor 10A by the number of magnetic poles) is θ. The angle of the circumferential-direction width of the q-axis core portion 17 is α. The angle of the circumferential-direction length of the bridge portion 20 is β.

In this instance, a pole-arc factor (α/θ) of the q-axis core portion 17 is set to 9% or more. A pole-arc factor (β/θ) of the bridge portion 20 is set to 12% or more. The suitable ranges of the pole-arc factors of the q-axis core portion 17 and the bridge portion 20 are confirmed by a second test and a third test, described hereafter.

In the rotor 10A according to the first embodiment, configured as described above, the filler material 14 that fills the outer flux barrier 18 repeatedly expands and contracts with the change in environmental temperature during operation and stop of the rotating electric machine. As a result, stress is generated in the bridge portion 20. In addition, stress is generated in the bridge portion 20 by centrifugal force during rotation of the rotor 10A.

At this time, the bridge portion 20 is configured such that the large-width portion 20a, the small-width portion 20b, and the medium-width portion 20c are sequentially disposed from the q-axis core portion 17 side towards the stator-side core portion 19 side. The large-width portion 20a, the small-width portion 20b, and the medium-width portion 20c refer to the width of the bridge portion 20 in the radial direction.

Therefore, the stress concentrated in the large-width portion 20a and the medium-width portion 20c on both ends of the bridge portion 20 in the circumferential direction (length direction) can be spread to the small-width portion 20b in the center portion of the bridge portion 20 in the circumferential direction. Therefore, the stress generated in the bridge portion 20 can be dispersed with more certainty. Concentration of stress can be suppressed. As a result, sufficient strength of the bridge portion 20 can be ensured.

In addition, according to the first embodiment, the stator-side core portion 19 has the projecting portion 19a. The projecting portion 19a projects towards the q-axis core portion 17 side with the corner portion 13e as the starting point. The corner portion 13e is the corner at which the stator-side end surface 13a and the q-axis core portion-side end surface 13d of the magnet 13 housed in the magnet housing hole 12 meet.

Therefore, the stator-side end surface 13a of the magnet 13 and the stator-side end surface 12a of the magnet housing hole 12 come into contact with each other. The amount of filler material 14 filling the area between the stator-side end surface 13a of the magnet 13 and the stator-side end surface 12a of the magnet housing hole 12 is reduced.

As a result, stress applied to the filler material 14 side can be significantly reduced. Furthermore, bonding between the magnet 13 and the rotor core 11 is improved. Therefore, demagnetization of the magnet 13 is inhibited. In addition, magnetic flux does not easily flow to the bridge portion 20 because the projecting portion 19a is provided. Therefore, reduction in the amount of effective magnetic flux can be suppressed.

In addition, according to the first embodiment, the pole-arc factor of the q-axis core portion 17 in relation to the pole pitch per single magnetic pole of the magnets 13 is 9% or more. The pole-arc factor of the bridge portion 20 in relation to the pole pitch per single magnetic pole of the magnets 13 is 12% or more. Therefore, the stress value can be made equal in all areas of the bridge portion 20.

Furthermore, the dimensional ratio of the radial-direction width W1 of the large-width portion 20a to the radial-direction width W2 of the small-width portion 20b to the radial-direction width W3 of the medium-width portion 20c of the bridge portion 20 is set to 1.7:1:1.1 (W1:W2:W3=1.7:1:1.1). Therefore, stress distribution can be made uniform in a shape that is optimal in terms of motor performance.

First Variation Example

Figure 3:
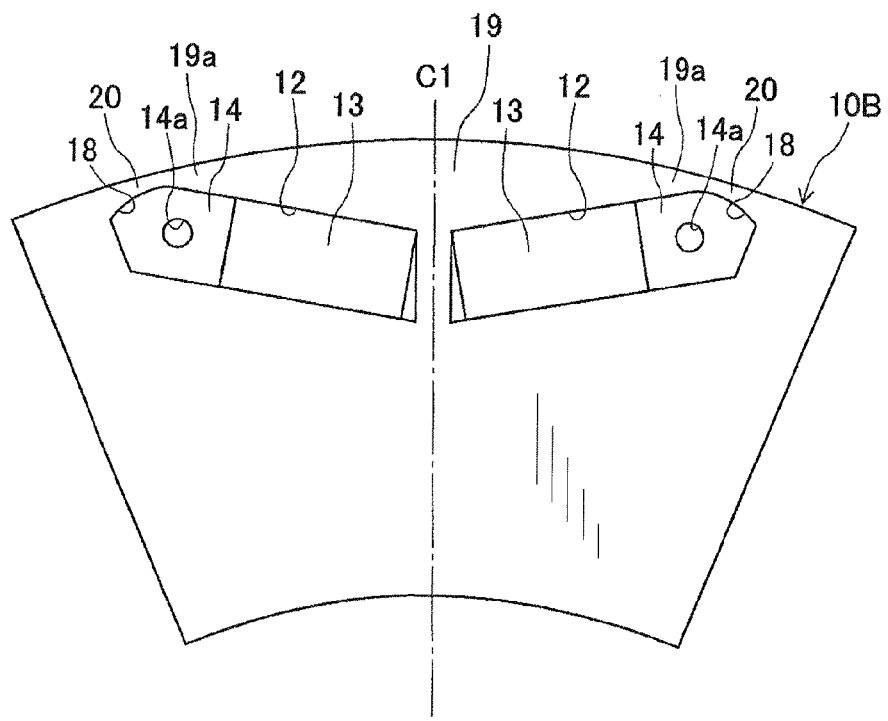
FIG. 3 is a partial planar view of an area amounting to a single magnetic pole in a rotor in a first variation example.

In the rotor 10A according to the above-described first embodiment, the filler material 14 filling the outer flux barrier 18 fills the overall area of the outer flux barrier 18. On the other hand, a gap portion 14a may be provided in a center portion of the outer flux barrier 18, as in a rotor 10B of a first variation example shown in FIG. 3. The gap portion 14a is an area that is not filled with the filler material 14. In this instance as well, operations and effects similar to those according to the first embodiment can be achieved. In addition, an effect is achieved in that the gap portion 14a can reduce thermal stress generated in the filler material 14 as a result of thermal expansion at high temperatures.

Second Variation Example

Figure 4:
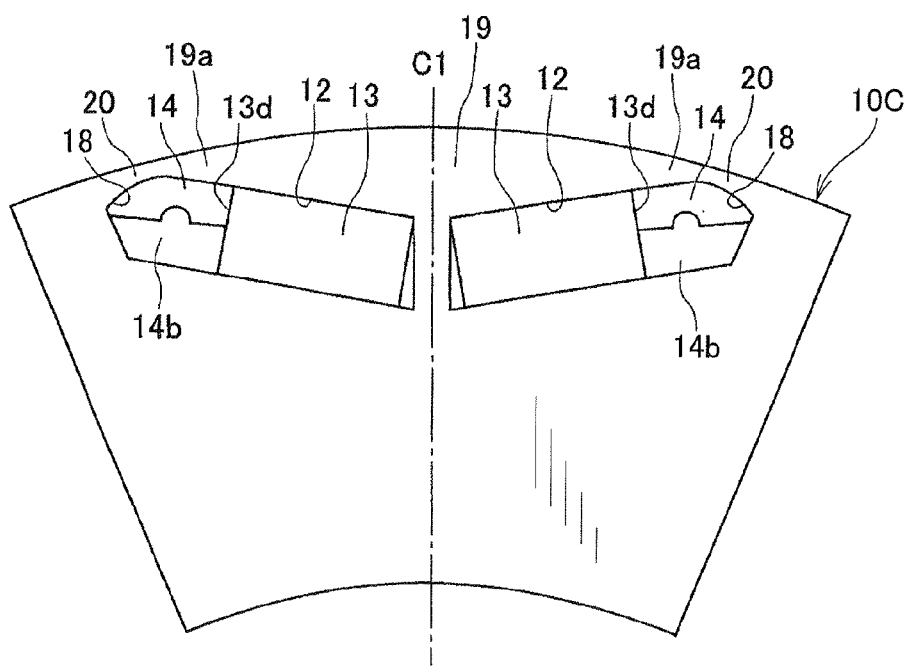
FIG. 4 is a partial planar view of an area amounting to a single magnetic pole in a rotor in a second variation example.

A gap portion 14b may be provided in the rotor 10A according to the above-described first embodiment, as in a rotor 10C of a second variation example shown in FIG. 4. The gap portion 14b is provided in an area that is substantially half of the outer flux barrier 18 on the inner circumferential side. The gap portion 14b is not filled with the filler material 14. In this instance, the filler material 14 comes into contact with the overall area of the bridge portion 20 in the length direction. The filler material 14 also comes into contact with at least a portion of the q-axis core portion-side end surface 13d of the magnet 13.

As a result, in a manner similar to that according to the first embodiment, stress generated in the bridge portion 20 can be dispersed with more certainty. Concentration of stress can be suppressed. In addition, in a manner similar to that in the first variation example, an effect is achieved in that the gap portion 14b can reduce thermal stress generated in the filler material 14 as a result of thermal expansion at high temperatures.

[First Test]

A test was performed on the rotor 10A according to the first embodiment to study the suitable range for setting the dimensional ratio (W1:W2:W3) of the radial-direction width W1 of the large-width portion 20a to the radial-direction width W2 of the small-width portion 20b to the radial-direction width W3 of the medium-width portion 20c of the bridge portion 20. A stress measuring device was used to perform the test.

In the test, the dimensional ratio (W1/W2) of the radial-direction width W1 of the large-width portion 20a to the radial-direction width W2 of the small-width portion 20b when the radial-direction width W2 of the small-width portion 20b is set to 1 (i.e., W2=1) was changed. In addition, the dimensional ratio (W3/W2) of the radial-direction width W3 of the medium-width portion 20c to the radial-direction width W2 of the small-width portion 20b when the radial-direction width W2 of the small-width portion 20b is set to 1 (i.e., W2=1) was changed. The stress generated in each of the large-width portion 20a, the small-width portion 20b, and the medium-width portion 20c in these instances was measured.

Figure 5:
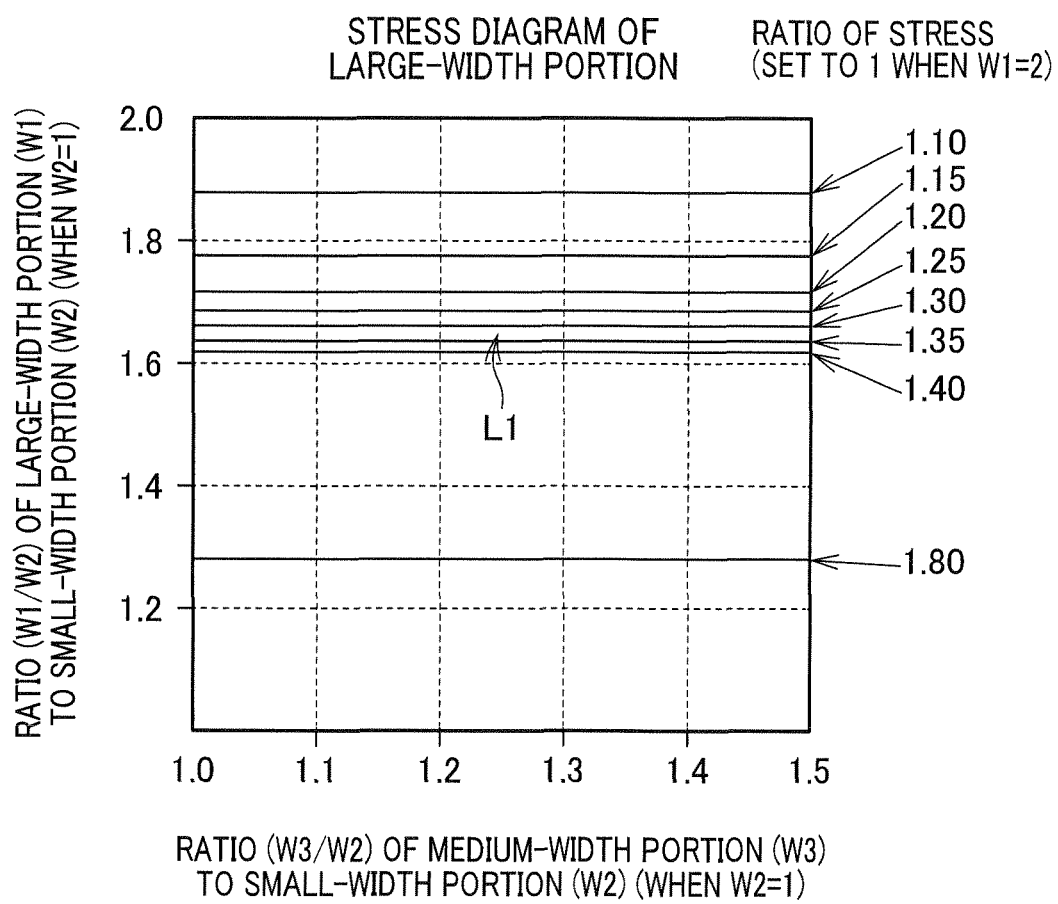
FIG. 5 is a stress diagram of a large-width portion of a bridge portion measured by a first test.
Figure 6:
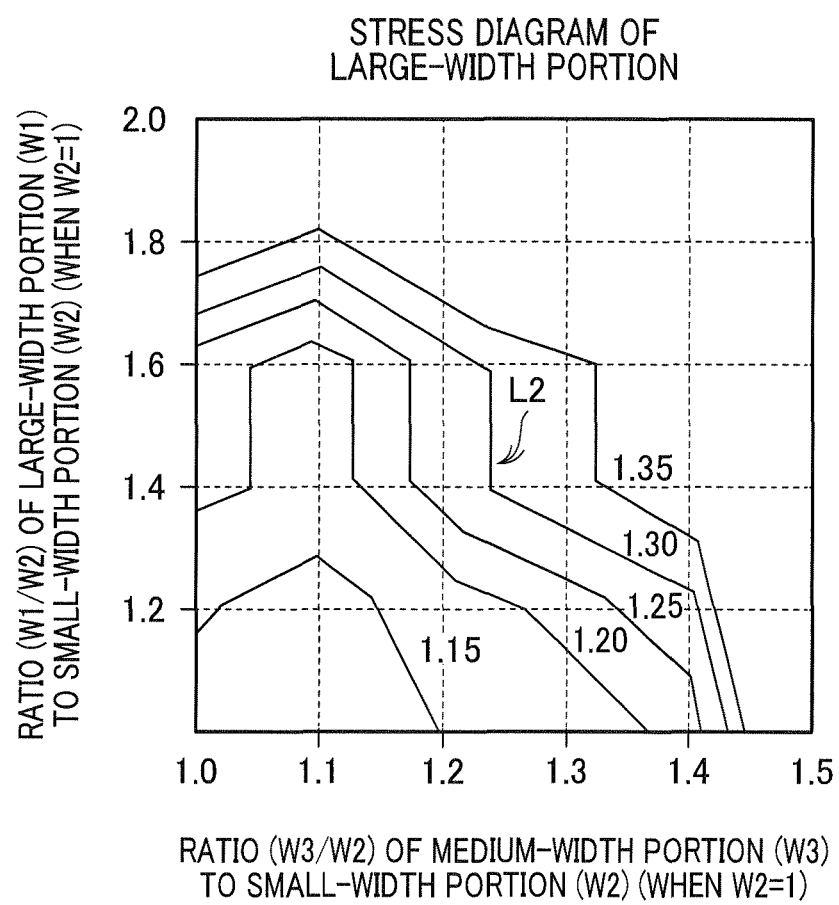
FIG. 6 is a stress diagram of a small-width portion of the bridge portion measured by the first test.
Figure 7:
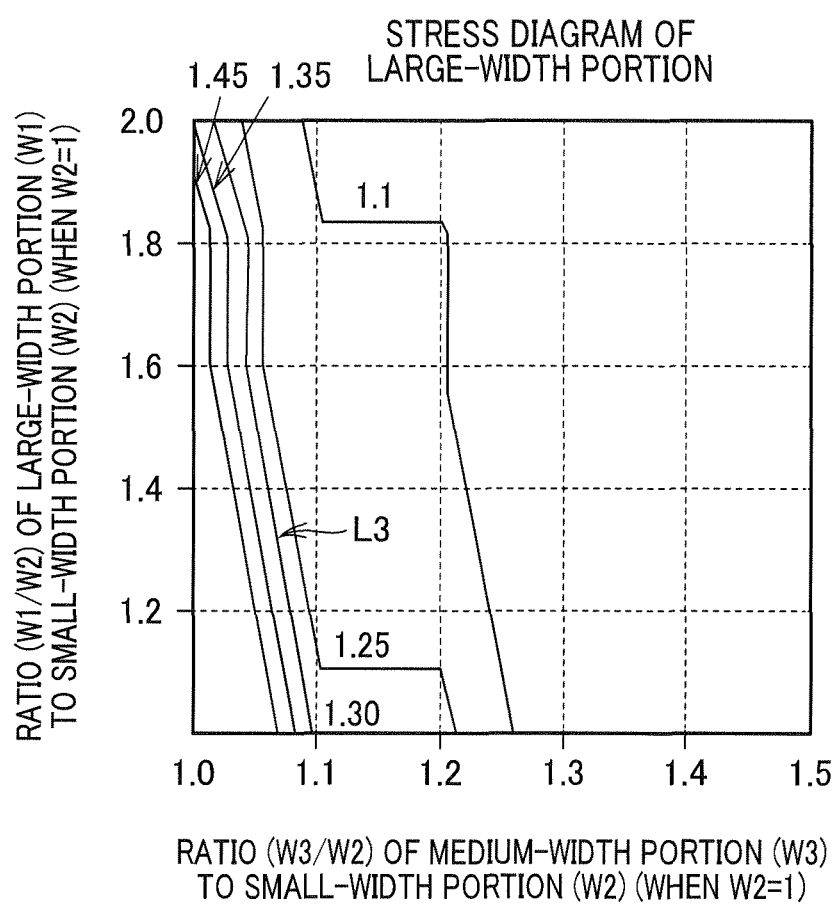
FIG. 7 is a stress diagram of a medium-width portion of the bridge portion measured by the first test.
Figure 8:
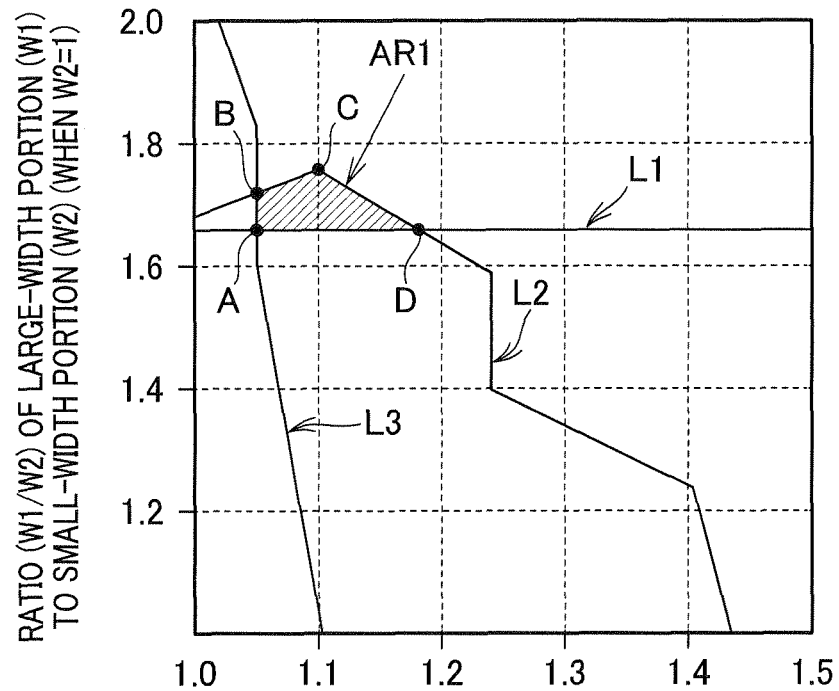
FIG. 8 is a stress diagram of a suitable range in which concentration of stress does not occur in the bridge portion, obtained by the first test.

FIG. 5 is a stress diagram of the large-width portion 20a. FIG. 6 is a stress diagram of the small-width portion 20b. FIG. 7 is a stress diagram of the medium-width portion 20c. FIG. 8 is a stress diagram in which the measured stress of the large-width portion 20a, the small-width portion 20b, and the medium-width portion 20c are integrated. FIG. 8 shows a suitable range in which concentration of stress in the bridge portion 20 does not occur.

FIGS. 5 to 7 show the ratios of stress in an instance in which stress is set to 1 when the radial-direction width W1 of the large-width portion 20a is 2 (i.e., W1=2). In FIGS. 5 to 8, a vertical axis shows the dimensional ratio (W1/W2) of the radial-direction width W1 of the large-width portion 20a to the radial-direction width W2 of the small-width portion 20b when W2=1, and a horizontal axis shows the dimensional ratio (W3/W2) of the radial-direction width W3 of the medium-width portion 20c to the radial-direction width W2 of the small-width portion 20b when W2=1.

FIG. 8 shows three lines L1 to L3 that have been selected from FIGS. 5 to 7. The lines L1 to L3 each indicate a ratio of stress of 1.30 in an instance in which stress is 1 when the radial-direction width W1 of the large-width portion 20a is 2. The ratio of stress of 1.30 was selected for the following reason.

When an area is enclosed (identified) by three lines indicating the same ratio of stress in the large-width portion 20a, the small-width portion 20b and the medium-width portion 20c in FIGS. 5 to 7, the ratio of stress of 1.30 is the smallest value of ratio of stress indicated by three lines capable of enclosing (identifying) an area. The dimensional ratio (W1:W2:W3) of the radial-direction width W1 of the large-width portion 20a to the radial-direction width W2 of the small width portion 20b to the radial-direction width W3 of the medium-width portion 20c at points A, B, C, and D is as shown in FIG. 8, i.e., (i) 1.65:1.00:1.05 at point A, (ii) 1.70:1.00:1.05 at point B, (iii) 1.75:1.00:1.10 at point C, and (iv) 1.65:1.00:1.18 at point D.

As shown in FIG. 8, the bridge portion 20 is set such that the dimensional ratio (W1:W2:W3) of the radial-direction width W1 of the large-width portion 20a to the radial-direction width W2 of the small-width portion 20b to the radial-direction width W3 of the medium-width portion 20c is in the range of an area AR1 enclosed by four line segments A-B, B-C, C-D, and D-A. The line segment A-B connects point A and point B. The line segment B-C connects point B and point C. The line-segment C-D connects point C and point D. The line segment D-A connects point D and point A.

It is clear that, as a result of this setting, concentration of stress can be effectively suppressed. Sufficient strength of the bridge portion 20 can be ensured. According to the first embodiment, the dimensional ratio of the radial-direction width W1 of the large-width portion 20a to the radial-direction width W2 of the small-width portion 20b to the radial-direction width W3 of the medium-width portion 20c is set to 1.7:1:1.1 (W1:W2:W3=1.7:1:1.1). This dimensional ratio is within the suitable range shown in FIG. 8, i.e., the range of the area AR1.

Second Embodiment

Figure 9:
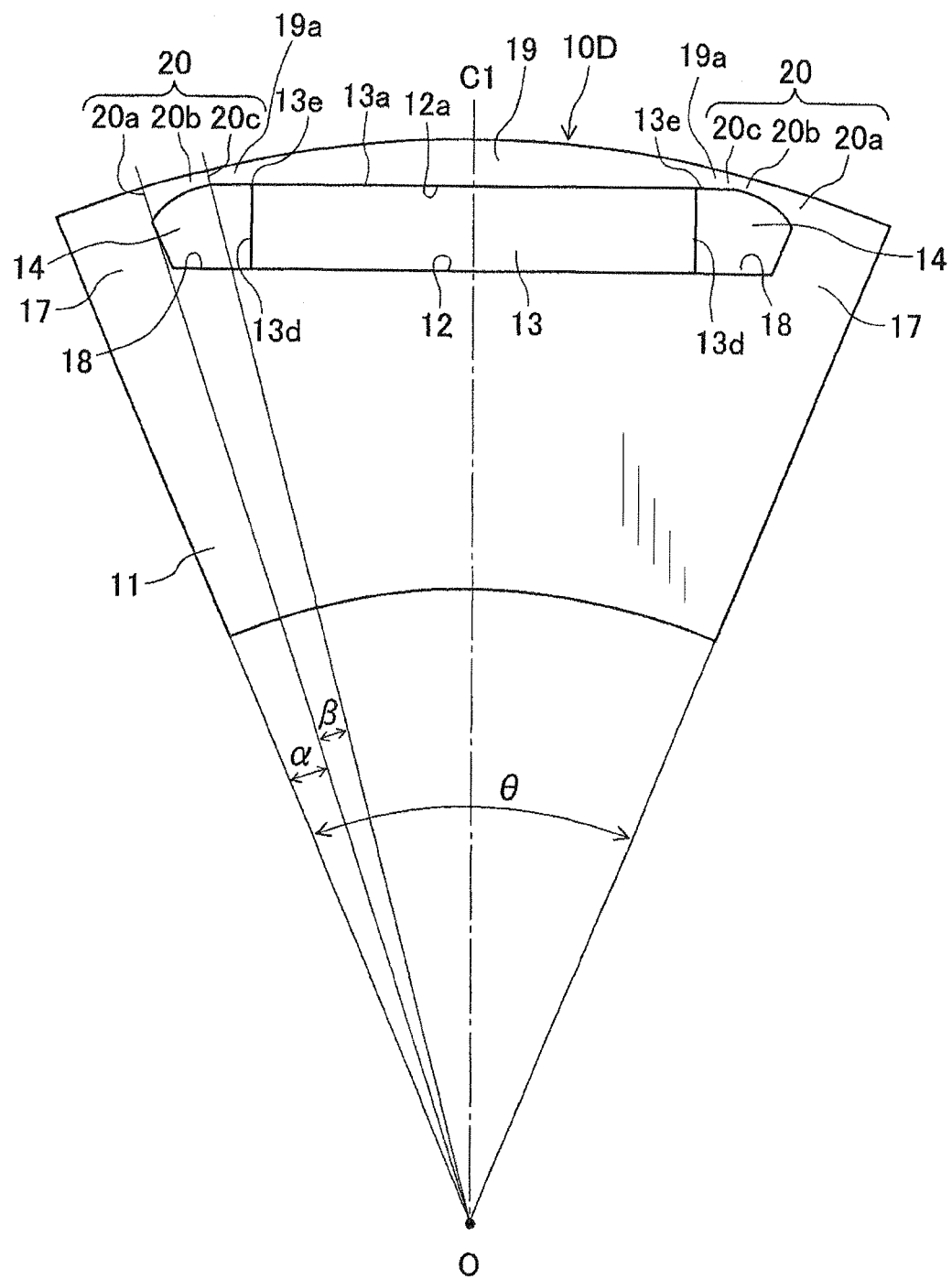
FIG. 9 is a partial planar view of an area amounting to a single magnetic pole of a rotor for a rotating electric machine according to a second embodiment.

A rotor 10D for a rotating electric machine according to a second embodiment will be described with reference to FIG. 9.

The rotor 10A according to the first embodiment is configured such that a single magnetic pole is formed by the pair of magnets 13 and 13 that are disposed in a V-shape. On the other hand, the rotor 10D according to the second embodiment differs in that it is configured such that a single magnetic pole is formed by a single magnet 13A. Therefore, a detailed description of the components and configurations shared with the first embodiment will be omitted. Differences and important points will be described hereafter. Components that are the same as those according to the first embodiment are given the same reference numbers.

The rotor core 11 according to the second embodiment is provided with a plurality of magnet housing holes 12 (12 holes according to the second embodiment) on the outer circumferential surface side opposing the inner circumferential surface of the stator.

The magnet housing holes 12 are formed such as to pass through the rotor core 11 in the axial direction. The magnet housing holes 12 are separated from each other by a predetermined distance in the circumferential direction. Each magnet housing hole 12 is formed having an irregular, substantially rectangular cross-sectional shape in the direction at a right angle to the center axis O of the rotor core 11. A total of 12 magnet housing holes 12 are provided at even intervals in the circumferential direction. Each magnet housing hole 12 is formed such as to be linearly symmetrical in relation to the magnetic-pole center line C1. The magnetic-pole center line C1 passes through the center axis O of the rotor core 11 and the center of the magnetic pole.

A single magnet (permanent magnet) 13 is housed in each magnet housing hole 12 in the center portion of the magnet housing hole 12 in the circumferential direction. The magnet 13 is plate-shaped and has a rectangular cross-sectional shape. A single magnetic pole is formed by the single magnet 13 housed in the magnet housing hole 12. In this instance, the 12 magnets 13 form a plurality of magnetic poles (12 poles [6 N-poles and 6 S-poles] according to the second embodiment). The polarity of the magnetic poles alternates in the circumferential direction.

The q-axis core portion 17 is formed between two magnetic poles that are adjacent to each other in the circumferential direction of the rotor core 11. The q-axis core portion 17 is an area in which magnetic flux flows from between the magnetic poles to an area between other magnetic poles. The outer flux barrier 18 is provided between the magnet 13 housed in the magnet housing hole 12 and the q-axis core portion 17. In other words, the outer flux bather 18 is provided on both sides in the circumferential direction of the magnet 13 housed in the magnet housing hole 12. The outer flux bather 18 serves as a magnetic gap portion.

In a manner similar to that according to the first embodiment, the magnet 13 that is housed in the magnet housing hole 12 is fixed and held within the magnet housing hole 12 by the filler material 14. The filler material 14 fills the magnet housing hole 12. According to the second embodiment as well, the overall area of the outer flux barrier 18 is also filled with the filler material 14. As a result, the magnet 13A that is housed in the magnet housing hole 12 is firmly fixed and held within the magnet housing hole 12.

In addition, the rotor core 11 has the stator-side core portion 19 on the stator side of the magnet housing hole 12. The stator-side core portion 19 has the projecting portion 19a. The projecting portion 19a projects towards the q-axis core portion 17 side with the corner portion 13e as a starting point. The corner portion 13e is a corner at which the stator-side end surface 13a and a q-axis core portion-side end surface 13d of the magnet 13 housed in the magnet housing hole 12 meet.

According to the second embodiment as well, the corner portion 13e of the magnet 13 housed in the magnet housing hole 12 comes into contact with the stator-side wall surface 12a of the magnet housing hole 12, in a manner similar to that according to the first embodiment. As a result, the filler material 14 does not easily enter the area between the stator-side end surface 13a of the magnet 13 and the stator-side wall surface 12a of the magnet housing hole 12.

The bridge portion 20 is formed between the projecting portion 19a and the q-axis core portion 17. In a manner similar to that according to the first embodiment, the bridge portion 20 is composed of the large-width portion 20a, the small-width portion 20b, and the medium-width portion 20c. The large-width portion 20a, the small width portion 12b, and the medium-width portion 20c are sequentially disposed from the q-axis core portion 17 side towards the stator-side core portion 19.

The large-width portion 20a has the largest width in the radial direction. The small-width portion 20b has the smallest width in the radial direction. The medium-width portion 20b has a width in the radial direction that is between those of the large-width portion 20a and the small-width portion 20b.

According to the second embodiment as well, the dimensional ratio of the radial-direction width of the large-width portion 20a to the radial-direction width of the small-width portion 20b to the radial-direction width of the medium-width portion 20c of the bridge portion 20 is set to 1.7:1:1.1, in a manner similar to that according to the first embodiment. Furthermore, according to the second embodiment as well, the pole-arc factor ($\alpha/\theta$) of the q-axis core portion 17 is set to 9% or more, and the pole-arc factor ($\beta/\theta$) of the bridge portion 20 is set to 12% or more, in a manner similar to that according to the first embodiment.

In the rotor 10D according to the second embodiment, configured as described above, in a manner similar to the rotor 10A according to the first embodiment, stress generated in the bridge portion 20 can be dispersed with more certainty. Concentration of stress can be suppressed. As a result, sufficient strength of the bridge portion 20 can be ensured.

In addition, in the rotor 10D according to the second embodiment as well, the stator-side core portion 19 has the projecting portion 19a. The projecting portion 19a projects towards the q-axis core portion 17 side with the corner portion 13e of the magnet 13A housed in the magnet housing hole 12 as the starting point. Therefore, magnetic flux does not easily flow to the bridge portion 20. As a result, operations and effects similar to those of the rotor 10A according to the first embodiment, such as suppressing reduction in the amount of effective magnetic flux, can be achieved.

Figure 10:
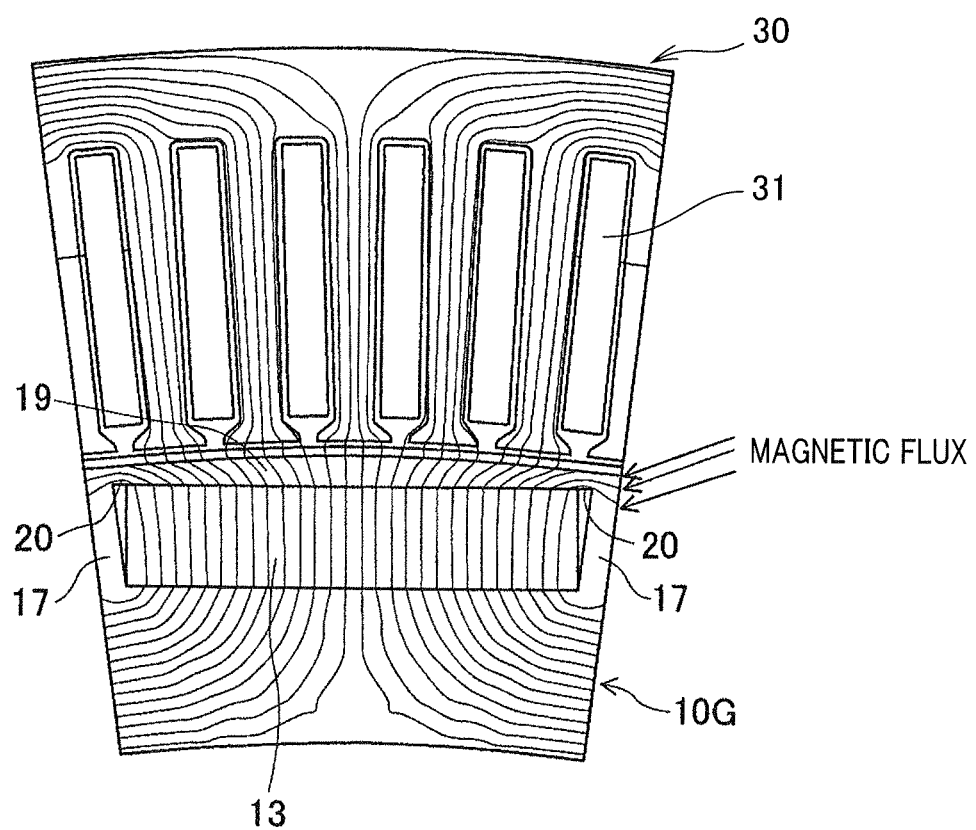
FIG. 10 is an explanatory diagram of lines of magnetic flux in a rotor in a first comparison example.

FIG. 10 is a diagram of lines of magnetic flux in a rotor 10G in a first comparison example. The rotor 10G is located such as to oppose a stator 30 in the radial direction. The stator 30 includes a stator winding 13 that is held in a plurality of slots formed in the inner periphery of the stator 30. In the rotor 10G, the stator-side core portion 19 is not provided with the projecting portion 19a. As is clear from FIG. 10, when the circumferential-direction length of the bridge 20 between the magnet 13 and the q-axis core portion 17 is too short, three lines of magnetic flux in FIG. 10 pass through the bridge portion 20 and end, remaining only in the rotor 10G. Therefore, in the first comparison example, it is clear that reduction in the amount of effective magnetic flux cannot be suppressed with certainty.

[Second Test]

A test was performed on the rotor 10A according to the first embodiment and the rotor 10D according to the second embodiment, described above, to study the suitable range for setting the circumferential-direction width of the q-axis core portion 17 of the rotor core 11. In the test, the pole-arc factor of the circumferential-direction width of the q-axis core portion 17 was changed such as to gradually increase. Reluctance torque ratios were measured with the reluctance torque ratio at 1 when the pole-arc factor is 6%. The results shown in FIG. 11 were obtained.

Figure 11:
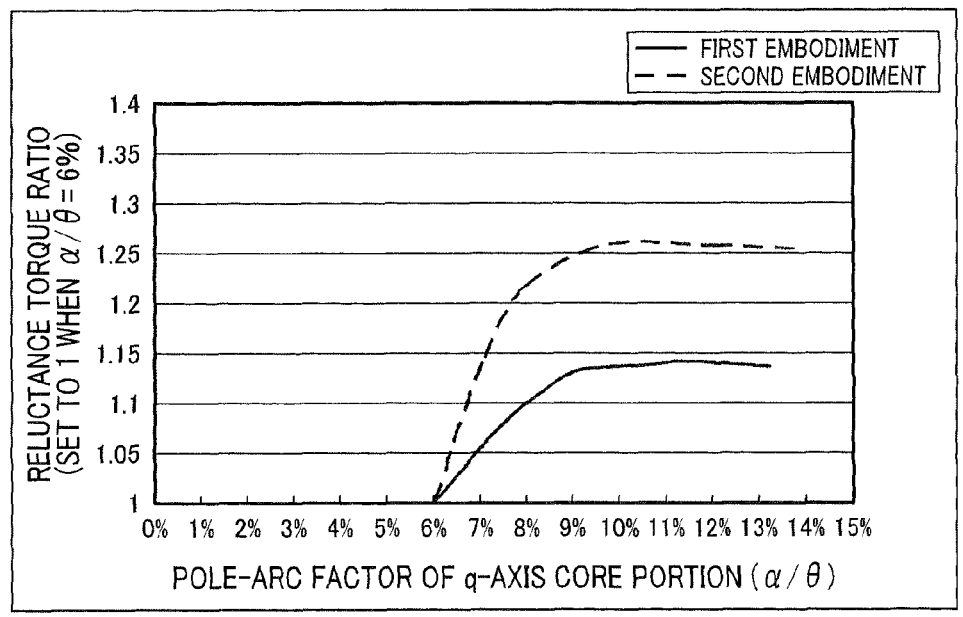
FIG. 11 is a graph of pole-arc factors of a q-axis core portion measured by a second test.

As is clear from FIG. 11, when the pole-arc factor of the circumferential-direction width of the q-axis core portion 17 exceeds 9%, the reluctance torque becomes a saturation state in both rotor 10A according to the first embodiment and rotor 10D according to the second embodiment. Therefore, the circumferential-direction width of the q-axis core portion 17 is preferably set such that the pole-arc factor is 9% or more.

[Third Test]

A test was performed on the rotor 10A according to the first embodiment and the rotor 10D according to the second embodiment, described above, to study the suitable range for setting the circumferential-direction length of the bridge portion 20 of the rotor core 11. In the test, the pole-arc factor of the circumferential-direction length of the bridge portion 20 was changed such as to gradually increase from 10%. Magnetic flux ratios where measured. The results shown in FIG. 12 were obtained.

Figure 12:
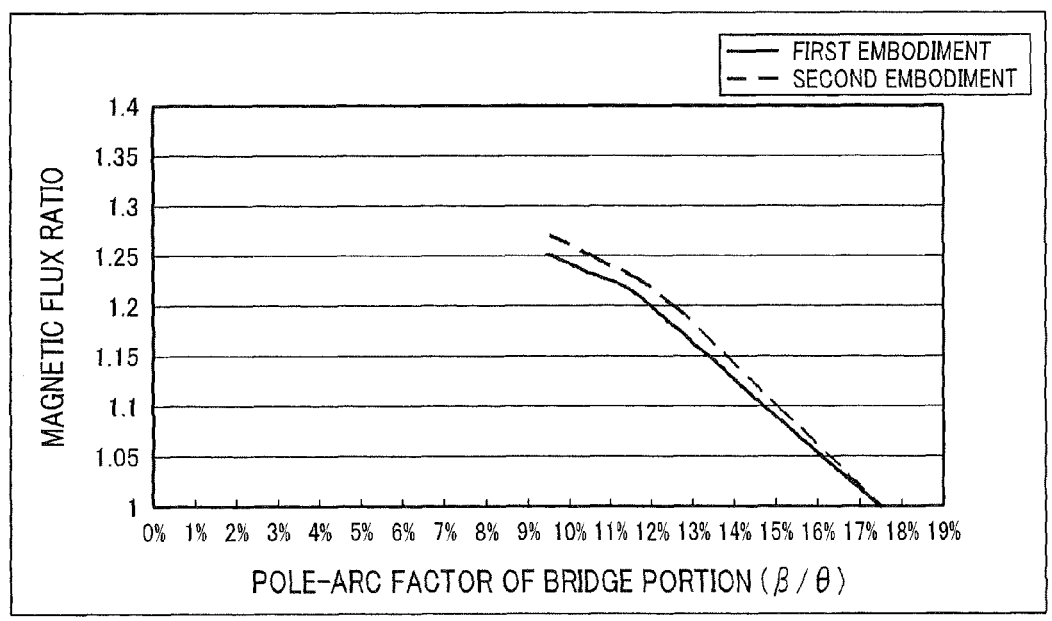
FIG. 12 is a graph of pole-arc factors of a bridge portion measured by a third test.

As is clear from FIG. 12, when the pole-arc factor of the circumferential-direction length of the bridge portion 20 exceeds 12%, the results become linear in both rotor 10A according to the first embodiment and rotor 10D according to the second embodiment. It is clear that increase in the amount of effective magnetic flux becomes significant. Therefore, circumferential-direction length of the bridge portion 20 is preferably set such that the pole-arc factor is 12% or more.

Third Embodiment

Figure 13:
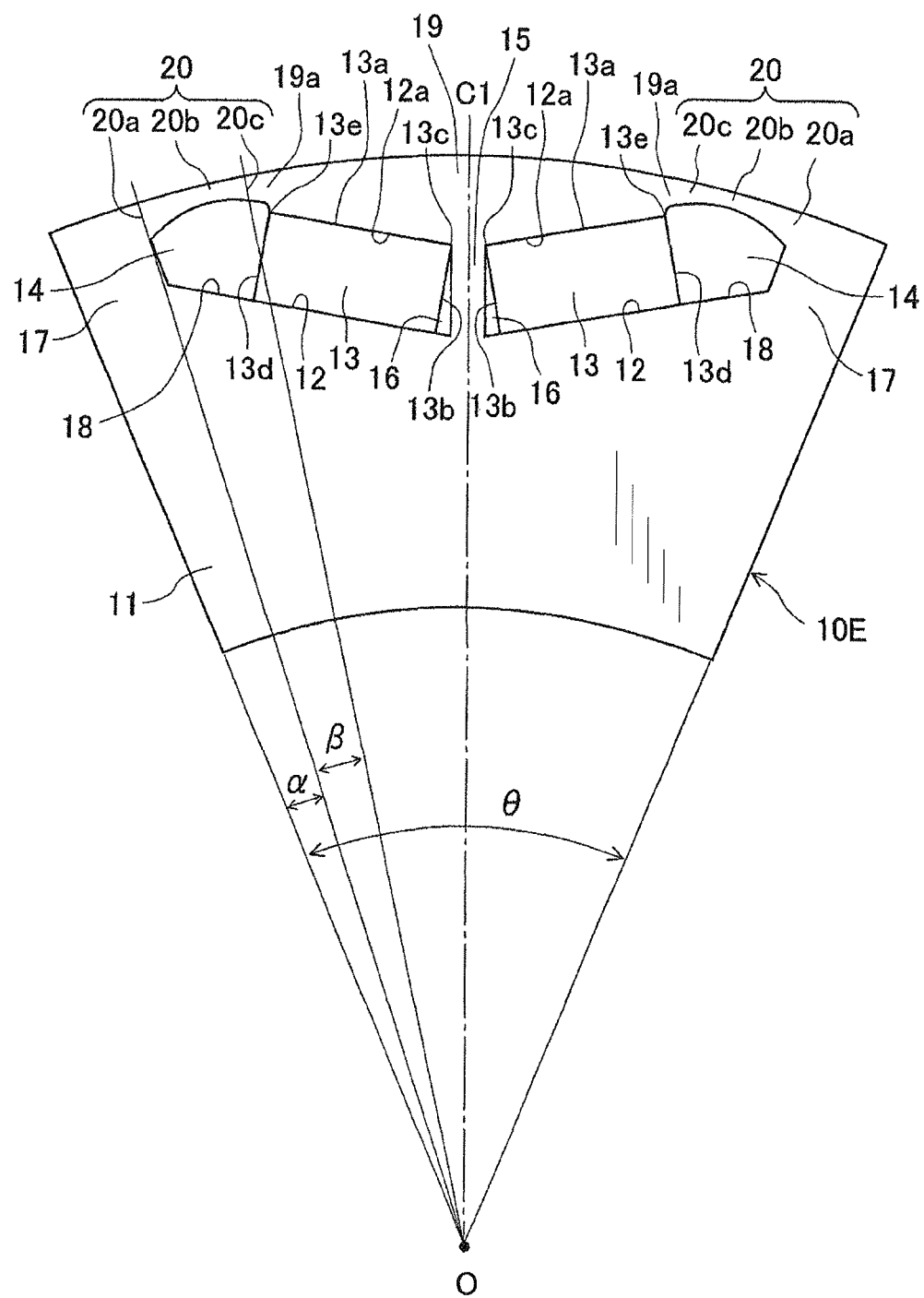
FIG. 13 is a partial planar view of an area amounting to a single magnetic pole of a rotor for a rotating electric machine according to a third embodiment.

A rotor 10E according to a third embodiment will be described with reference to FIG. 13.

In the rotor 10A according to the first embodiment, the wall surface of the projecting portion 19a on the inner circumferential side is formed into a flat surface that continues from the stator-side wall surface 12a of the magnet housing hole 12 and widens in a planar shape.

On the other hand, the rotor 10E according to the third embodiment differs from the rotor 10A according to the first embodiment in that the wall surface of the projecting portion 19a on the inner circumferential side is formed into an arc-shaped surface (curved surface) having a predetermined radius of curvature.

Therefore, a detailed description of the components and configurations shared with the first embodiment will be omitted. Differences and important points will be described hereafter. Components that are the same as those according to the first embodiment are given the same reference numbers.

The rotor core 11 according to the third embodiment has the stator-side core portion 19 on the stator side of the pair of magnet housing holes 12 and 12 that are disposed in a V-shape. The stator-side core portion 19 has the projecting portion 19a. The projecting portion 19a projects towards the q-axis core portion 17 side with the corner portion 13e as a starting point. The corner portion 13e is a corner at which the stator-side end surface 13a and the q-axis core portion-side end surface 13d of the magnet 13 housed in the magnet housing hole 12 meet.

According to the third embodiment, the wall surface of the projecting portion 19a on the inner circumferential side is formed into an arc-shaped surface having a radius r. A point within the outer flux barrier 18 serves as the center of the arc-shaped surface. The circumferential-direction length of the projecting portion 19a is shorter than that according to the first embodiment.

According to the third embodiment as well, the corner portion 13e of the magnet 13 housed in the magnet housing hole 12 comes into contact with the stator-side wall surface 12a of the magnet housing hole 12. As a result, the filler material 14 does not easily enter the area between the stator-side end surface 13a of the magnet 13 and the stator-side wall surface 12a of the magnet housing hole 12.

In a manner similar to that according to the first embodiment, the bridge portion 20 is formed between the projecting portion 19a and the q-axis core portion 17. The bridge portion 20 is composed of the large-width portion 20a, the small-width portion 20b, and the medium-width portion 20c. The large-width portion 20a, the small width portion 12b, and the medium-width portion 20c are sequentially disposed from the q-axis core portion 17 side towards the stator-side core portion 19.

According to the third embodiment as well, the dimensional ratio of the radial-direction widths of the large-width portion 20a to the small-width portion 20b to the medium-width portion 20c of the bridge portion 20 is set to 1.7:1:1.1, in a manner similar to that according to the first embodiment. Furthermore, the pole-arc factor ($\alpha/\theta$) of the q-axis core portion 17 is set to 9% or more, and the pole-arc factor (β/θ) of the bridge portion 20 is set to 12% or more, in a manner similar to that according to the first embodiment.

However, according to the third embodiment, the wall surface of the projecting portion 19a on the inner circumferential side is formed into an arc-shaped surface. The circumferential-direction length of the projecting portion 19a is shorter than that according to the first embodiment. Therefore, the circumferential-direction length of the bridge portion 20 is longer than that according to the first embodiment.

In other words, in the bridge portion 20 according to the third embodiment, the distance separating the large-width portion 20a and the medium-width portion 20c positioned on both ends in the circumferential direction is greater than that according to the first embodiment. Therefore, the positions on both ends of the bridge portion 20 in the circumferential direction where concentration of stress easily occurs are set farther apart.

In the rotor 10E according to the third embodiment, configured as described above, stress generated in the bridge portion 20 can be dispersed with more certainty. Concentration of stress can be suppressed. As a result, operations and effects similar to those of the rotor 10A according to the first embodiment, such as ensuring sufficient strength in the bridge portion 20, are achieved.

In particular, according to the third embodiment, the wall surface of the projecting portion 19a on the inner circumferential side is formed into an arc-shaped surface. The circumferential-direction length of the projecting portion 19a is shorter than that according to the first embodiment. Therefore, the positions on both ends of the bridge portion 20 in the circumferential direction where concentration of stress easily occurs are set farther apart. Concentration of stress occurring in the bridge portion 20 can be suppressed with further certainty. As a result, the strength of the bridge portion 20 can be significantly improved.

Other Embodiments

The present invention is not limited by the above-described embodiments. Various modifications can be made without departing from the spirit of the present invention.

For example, according to the above-described embodiments, an example is described of an inner-rotor type rotating electric machine in which the rotor 10A to 10E is disposed within the stator. However, the present invention can also be applied to an outer-rotor type rotating electric machine in which the rotor 10A to 10E is disposed outside of the stator.

In addition, according to the above-described embodiments, an example is described in which the rotor for a rotating electric machine of the present invention is applied to a rotor in a motor for a vehicle. However, the present invention can also be applied to a rotor for a rotating electric machine that is mounted in a vehicle and used as a motor or a power generator. The present invention can also be applied to a rotor for a rotating electric machine that can be selectively used as a motor or a power generator.

What is claimed is:

1. A rotor for a rotating electric machine comprising:
a rotor core that is disposed such as to oppose a stator in a radial direction of the rotor, a plurality of magnet housing holes being formed in the rotor core and arrayed in a circumferential direction of the rotor; and
a plurality of magnets, each housed in the magnet housing hole, that form a plurality of magnetic poles arrayed in the circumferential direction and are fixed and held in the magnet housing holes by a filler material,
the rotor core including: a q-axis core portion formed between two magnetic poles that are adjacent to each other in the circumferential direction; an outer flux barrier that is formed between the q-axis core portion and the magnet and is filled with the filler material; and a bridge portion that is formed between a stator-side core portion positioned on the stator side of the magnet housing hole and the q-axis core portion,
the bridge portion including a large-width portion, a small-width portion and a medium-width portion that are sequentially disposed from the side of the q-axis core portion towards the side of the stator-side core portion in the circumferential direction,
the large-width portion having the largest radial-direction width in the bridge portion,
the small-width portion having the smallest radial-direction width in the bridge portion,
the medium-width portion having a medium radial-direction width between the radial-direction width of the large-width portion and the radial-direction width of the small-width portion,
wherein:
the stator-side core portion includes a projecting portion projecting towards the side of the q-axis core portion from a corner portion as a starting point at which a stator-side end surface and a q-axis core portion-side end surface of the magnet housed in the magnet housing hole meet;
the rotor core is configured such that α/θ is set to 9% or more, where α/θ is a pole-arc factor of the q-axis core portion, α is an angle of a circumferential-direction width of the q-axis core portion and θ is an angle of a pole pitch per single magnetic pole of the magnets;
the rotor core is configured such that β/θ is set to 12% or more, where β/θ is a pole-arc factor of the bridge portion, β is an angle of a circumferential-direction width of the bridge portion and θ is an angle of a pole pitch per single magnetic pole of the magnets;
the bridge portion is configured such that a dimensional ratio of radial-direction widths of the large-width portion, the small-width portion, and the medium-width portion is in a range of an area enclosed by line segments in a coordinate system;
the coordinate system has a vertical axis and a horizontal axis,
the vertical axis showing a dimensional ratio of the radial-direction width of the large-width portion to the radial-direction width of the small-width portion when the radial-direction width of the small-width portion is 1,
the horizontal axis showing a dimensional ratio of the radial-direction width of the medium-width portion to the radial-direction width of the small-width portion when the radial-direction width of the small-width portion is 1;
the line segments includes: a first line segment that connects a first point and a second point; a second line segment that connects the second point and a third point; a third line segment that connects the third point and a fourth point; and a fourth line segment that connects the fourth point and the first point; and
a dimensional ratio of the radial-direction width of the large-width portion the radial-direction width of the small width portion to the radial-direction width of the medium-width portion is set to: (i) 1.65:1.00:1.05 at the first point; (ii) 1.70:1.00:1.05 at the second point; (iii) 1.75:1.00:1.10 at the third point; and (iv) 1.65:1.00:1.18 at the fourth point.

2. The rotor according to claim 1, wherein:
the dimensional ratio of the radial-direction width of the large-width portion to the radial-direction widths of the small width portion to the radial-direction width of the medium-width portion is set to 1.7:1:1.1.

3. The rotor according to claim 1, wherein:
the rotor is configured such that a single magnetic pole is formed by a single magnet.

4. A rotor for a rotating electric machine comprising:
a rotor core that is disposed such as to oppose a stator in a radial direction of the rotor, a plurality of magnet housing holes being formed in the rotor core and arrayed in a circumferential direction of the rotor; and
a plurality of magnets, each housed in the magnet housing hole, that form a plurality of magnetic poles arrayed in the circumferential direction and are fixed and held in the magnet housing holes by a filler material,
the rotor core including: a q-axis core portion formed between two magnetic poles that are adjacent to each other in the circumferential direction; an outer flux barrier that is formed between the q-axis core portion and the magnet and is filled with the filler material; and a bridge portion that is formed between a stator-side core portion positioned on the stator side of the magnet housing hole and the q-axis core portion,
the bridge portion including a large-width portion, a small-width portion and a medium-width portion that are sequentially disposed from the side of the q-axis core portion towards the side of the stator-side core portion in the circumferential direction,
the large-width portion having the largest radial-direction width in the bridge portion,
the small-width portion having the smallest radial-direction width in the bridge portion,
the medium-width portion having a medium radial-direction width between the radial-direction width of the large-width portion and the radial-direction width of the small-width portion,
wherein:
the rotor core is configured such that $\alpha/\theta$ is set to 9% or more, where $\alpha/\theta$ is a pole-arc factor of the q-axis core portion, $\alpha$ is an angle of a circumferential-direction width of the q-axis core portion and $\theta$ is an angle of a pole pitch per single magnetic pole of the magnets;
the rotor core is configured such that $\beta/\theta$ is set to 12% or more, where $\beta/\theta$ is a pole-arc factor of the bridge portion, $\beta$ is an angle of a circumferential-direction width of the bridge portion and $\theta$ is an angle of a pole pitch per single magnetic pole of the magnets;
the bridge portion is configured such that a dimensional ratio of radial-direction widths of the large-width portion, the small-width portion, and the medium-width portion is in a range of an area enclosed by line segments in a coordinate system;
the coordinate system has a vertical axis and a horizontal axis,
the vertical axis showing a dimensional ratio of the radial-direction width of the large-width portion to the radial-direction width of the small-width portion when the radial-direction width of the small-width portion is 1,
the horizontal axis showing a dimensional ratio of the radial-direction width of the medium-width portion to the radial-direction width of the small-width portion when the radial-direction width of the small-width portion is 1;
the line segments includes: a first line segment that connects a first point and a second point; a second line segment that connects the second point and a third point; a third line segment that connects the third point and a fourth point; and a fourth line segment that connects the fourth point and the first point; and
a dimensional ratio of the radial-direction width of the large-width portion to the radial-direction width of the small width portion to the radial-direction width of the medium-width portion is set to: (i) 1.65:1.00:1.05 at the first point; (ii) 1.70:1.00:1.05 at the second point; (iii) 1.75:1.00:1.10 at the third point; and (iv) 1.65:1.00:1.18 at the fourth point.

5. The rotor according to claim 4, wherein:
the dimensional ratio of the radial-direction width of the large-width portion to the radial-direction width of the small width portion to the radial-direction width of the medium-width portion is set to 1.7:1:1.1.

6. A rotating electric machine, comprising:
a stator; and
a rotor including:
a rotor core that is disposed such as to oppose a stator in a radial direction of the rotor, a plurality of magnet housing holes being formed in the rotor core and arrayed in a circumferential direction of the rotor; and
a plurality of magnets, each housed in the magnet housing hole, that form a plurality of magnetic poles arrayed in the circumferential direction and are fixed and held in the magnet housing holes by a filler material,
the rotor core including: a q-axis core portion formed between two magnetic poles that are adjacent to each other in the circumferential direction, an outer flux barrier that is formed between the q-axis core portion and the magnet and is filled with the filler material; and a bridge portion that is formed between a stator-side core portion positioned on the stator side of the magnet housing hole and the q-axis core portion,
the bridge portion including a large-width portion, a small-width portion and a medium-width portion that are sequentially disposed from the side of the q-axis core portion towards the side of the stator-side core portion in the circumferential direction,
the large-width portion having the largest radial-direction width in the bridge portion,
the small-width portion having the smallest radial-direction width in the bridge portion,
the medium-width portion having a medium radial-direction width between the radial-direction width of the large-width portion and the radial-direction width of the small-width portion,
wherein:
the stator-side core portion includes a projecting portion projecting towards the side of the q-axis core portion from a corner portion as a starting point at which a stator-side end surface and a q-axis core portion-side end surface of the magnet housed in the magnet housing hole meet;
the rotor core is configured such that $\alpha/\theta$ is set to 9% or more and $\beta/\theta$ is set to 12% or more, where $\alpha/\theta$ is a pole-arc factor of the q-axis core portion, $\beta/\theta$ is a pole-arc factor of the bridge portion, $\alpha$ is an angle of a circumferential-direction width of the q-axis core portion, $\beta$ is an angle of a circumferential-direction width of the bridge portion, and θ is an angle of a pole pitch per single magnetic pole of the magnets;

the bridge portion is configured such that a dimensional ratio of radial-direction widths of the large-width portion, the small-width portion, and the medium-width portion is in a range of an area enclosed by line segments in a coordinate system;

the coordinate system has a vertical axis and a horizontal axis, the vertical axis showing a dimensional ratio of the radial-direction width of the large-width portion to the radial-direction width of the small-width portion when the radial-direction width of the small-width portion is 1, the horizontal axis showing a dimensional ratio of the radial-direction width of the medium-width portion to the radial-direction width of the small-width portion when the radial-direction width of the small-width portion is 1;

the line segments includes: a first line segment that connects a first point and a second point; a second line segment that connects the second point and a third point; a third line segment that connects the third point and a fourth point; and a fourth line segment that connects the fourth point and the first point; and a dimensional ratio of the radial-direction width of the large-width portion to the radial-direction width of the small width portion to the radial-direction width of the medium-width portion is set to: (i) 1.65:1.00:1.05 at the first point; (ii) 1.70:1.00:1.05 at the second point; (iii) 1.75:1.00:1.10 at the third point; and (iv) 1.65:1.00:1.18 at the fourth point.

\* \* \* \* \*